United States Patent [19]

Borges et al.

[11] 4,452,842
[45] Jun. 5, 1984

[54] LAMINATED LIDDING MATERIAL

[76] Inventors: Gary G. Borges, 1365 Goodrich Ave. SE., St. Paul; James H. Rebholz, 3201 Countrywood Dr., Brunsville, both of Minn. 55337

[21] Appl. No.: 379,618

[22] Filed: May 19, 1982

[51] Int. Cl.³ .................................................. C08G 18/79
[52] U.S. Cl. ............................. 428/195; 215/347; 215/348; 215/349; 220/200; 220/359; 229/43; 428/516; 428/200; 428/201; 428/423.1; 428/423.5; 428/423.7; 428/424.8; 428/425.8; 428/461; 428/476.1; 428/483; 428/502; 428/513
[58] Field of Search ............... 428/215, 423.1, 423.5, 428/423.7, 424.8, 481, 516, 200, 201, 425.8, 461, 476.1, 483, 502, 513; 220/200, 359; 215/347, 348, 349; 229/43

[56] References Cited

U.S. PATENT DOCUMENTS

| | | | |
|---|---|---|---|
| 3,582,452 | 6/1971 | Britton | 428/424.8 |
| 4,092,452 | 5/1978 | Hori et al. | 428/215 |
| 4,171,084 | 10/1979 | Smith | 220/359 |
| 4,216,268 | 8/1980 | Stillman | 428/424.8 |
| 4,284,672 | 8/1981 | Stillman | 428/35 |

FOREIGN PATENT DOCUMENTS

| | | | |
|---|---|---|---|
| 54-103475 | 8/1979 | Japan | 428/423.7 |
| 55-103955 | 8/1980 | Japan | 428/424.2 |

*Primary Examiner*—George F. Lesmes
*Assistant Examiner*—E. Rollins Buffalow

[57] ABSTRACT

A laminated lidding material suitable for use on cups of high density polyethylene and/or polypropylene comprises (1) as the bottom layer, a co-extruded layer of ethylene methyl acrylate and low density polyethylene resin, (2) a primer layer, preferably of polyurethane, (3) a layer of polyester, nylon, polypropylene or metallic foil, (4) a layer of low density polyethylene resin, and (5) a top layer of metallic foil, preferably aluminum foil. Lids prepared from this material can be adhered to the tops of high density polyethylene and/or polypropylene cups, and have sufficient strength so that they do not tear on removal.

6 Claims, 1 Drawing Figure

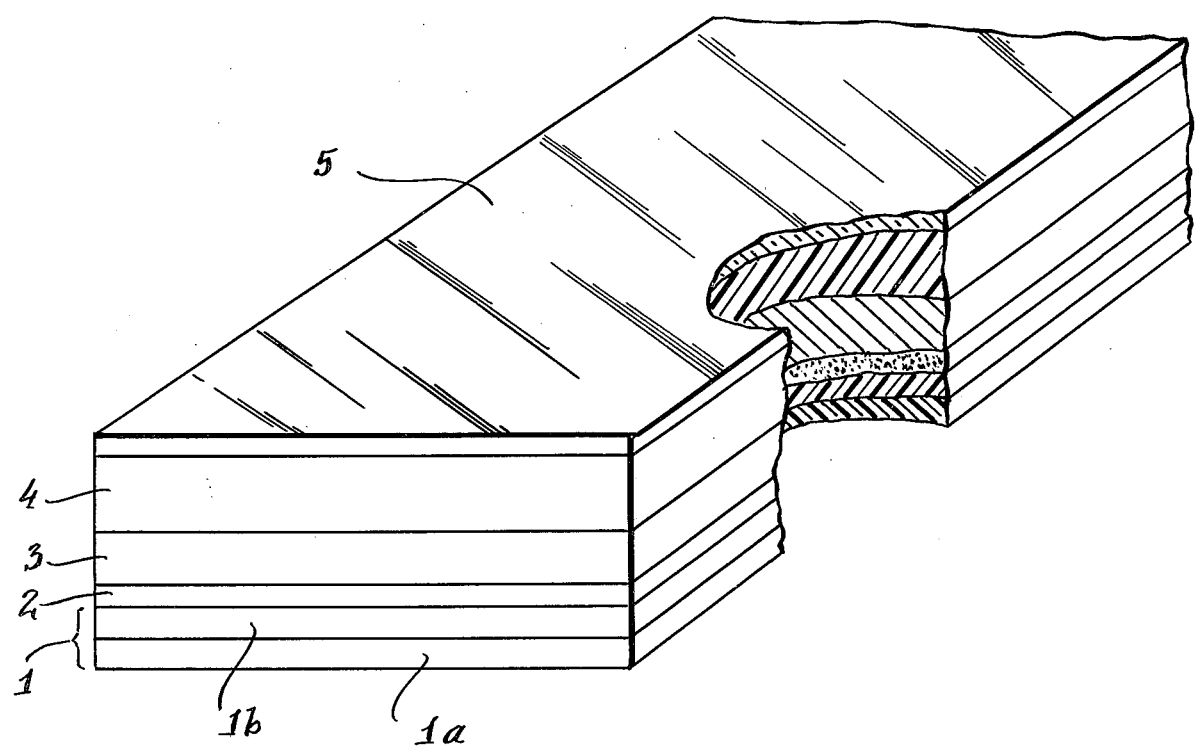

LAMINATED LIDDING MATERIAL

BACKGROUND OF THE INVENTION

This invention relates to laminated packaging materials designed for use as lids for high density polyethylene and/or polypropylene cups. More particularly, it relates to a lidding material comprising a co-extruded layer of ethylene methyl acrylate and low density polyethylene resin, a layer of polyester, a layer of low density polyolefin resin, and a layer of metallic foil.

Food products, particularly beverages and other materials having high liquid content, are increasingly being sold in containers made of high density polyethylene and/or polypropylene. One of the principal uses for containers of this type is for the sale of food products for on-premises or off-premises comsumption. For ease of handling, particularly when the containers or cups are filled at a location other than that in which the product is sold, the cups are sealed with a lidding material. Such lidding material may consist of a molded lid made out of a high density polyethylene or polypropylene material similar to or identical to the container material, molded so as to provide a slot adapted to receive the upper rim of the container. Lids of this nature, however, often do not fit tightly enough and, as a result, there is some spillage of the beverage during transport. There has therefore been developed an alternate type of lidding material, namely a laminated structure and one or more additional film layers. Typically, this laminated structure, which is adhered to the top of the beverage container by the use of heat and pressure, seals the top of said container and has a protruding tab so that the lid can be easily removed. In many instances, however, grasping of the tab results in only partial removal of the lid because the lid itself is torn. Use of a weaker adhesive substance would diminish the likelihood of tearing the lid but would serve effectively to protect the contents of the beverage container.

It is therefore a principal object of this invention to provide a metallic foil based lidding material of sufficient strength so that, upon removal, a lid made therefrom will separate from the container without tearing. It is a further object of this invention to provide a lidding material which is not substantially thicker than metallic foil based lidding materials currently in use. These, and further objects of the invention will be more apparent from the following description.

PRIOR ART

U.S. Pat. No. 4,092,452 to Hori et al. discloses a laminated aluminum foil-based structure designed primarily for protecting communication cable, but also useable as a packaging material. There is co-extruded onto one surface of aluminum foil, a first layer of an ethylenically unsaturated carboxylic acid (or ester) copolymer and a second layer which may be polyethylene.

U.S. Pat. No. 4,188,443 to Mueller et al. discloses a polyester-based multilayer flexible thermoplastic film. Said film can comprise (a) an outer layer of a polyester, polyethylene, polypropylene, ethylene vinyl acetate copolymer, etc., (b) an inner layer of polyethylene, (c) a middle layer of polyester, (d) the inner layer again, and (e) the outer layer again.

U.S. Pat. No. 4,216,268 to Stillman discloses aluminum foil-based packaging material coated on the outside by a polyamide and on the inside by sucessive layers of biaxially oriented polypropylene and heat sealable polyethylene/polypropylene.

U.S. Pat. No. 4,275,099 to Dani discloses a polyester resin-based laminate for use as protective or decorative molding strips on automobile bodies. A transparent polyester resin film has a coating of vacuum-deposited aluminum metal. On the metallized surface there is, in order, a primer, a polyurethane adhesive and an outer layer of polyvinyl chloride. On the non-metallized surface there may be additional layers of primer, adhesive, primer and polyvinyl chloride or fluoride.

U.S. Pat. No. 4,284,672 to Stillman is similar to U.S. Pat. No. 4,216,268, with the two inner layers replaced by a single layer of a heat sealable ethylene copolymer.

SUMMARY OF THE INVENTION

This invention provides a high strength laminated lidding material. The bottom layer is a coextruded layer of ethylene methyl acrylate (EMA) and low density polyethylene resin. A primer layer of, for example, polyurethane is affixed to the polyethylene resin and a layer of polyester, nylon, polypropylene or metallic film is affixed to the primer. There follows, in succession, a layer of a low density polyolefin (preferably polyethylene) and a top layer of metallic foil (preferably aluminum foil). The free upper surface of the metallic foil layer may be primed and printed, and the primed and printed metallic foil layer is preferably covered by a lacquer.

BRIEF DESCRIPTION OF THE DRAWING

The single FIGURE is a perspective view, partially in section, showing the laminated lidding material of this invention.

DETAILED DESCRIPTION OF THE INVENTION

The laminated lidding material of this invention is composed of five essential layers. This material is particularly suitable for use in lids to be adhered to, and act as closures for, containers made of high density polyethylene and/or polypropylene. The layers, in ascending order—i.e. from the layer designed to adhesively engage the top of the container—are as follows: (a) a co-extruded layer of ethylene methyl acrylate and low density polyethylene resin, (b) primer layer, preferably of polyurethane or melamine, (c) a layer of polyester, nylon, polypropylene or metallic film, preferably polyester, (d) a layer of low density polyolefin, preferably polyethylene, and (e) a top layer of metallic foil, preferably aluminum. The metallic layer can be further primed and printed on the free surface. Regardless of whether said layer is printed, it is preferable also to provide an uppermost layer of a lacquer coating.

The various layers will now be described in detail, with particular reference to the accompanying drawing.

A co-extruded layer 1 is provided which comprises a lower sub-layer of ethylene methyl acrylate copolymer 1a and an upper sub-layer of low density polyethylene resin 1b. The polyethylene resin sub-layer can comprise from about 5 to about 95 weight percent, preferably from 60 to 80 weight percent, of the co-extruded layer. The polyethylene resin has a density of about 0.90 to 0.93, preferably 0.91 to 0.92. The ethylene methyl acrylate (EMA) sealant layer can comprise from 5 to about 90 weight percent, preferably from 15 to 30 weight percent of the co-extruded layer. The EMA resin has a density of about 0.930 to 0.960, preferably 0.940 to 0.950.

The next layer 2 is a primer, which may be a conventional adhesive primer known in the art such as, for example, polyethylene imine or, preferably, polyurethane or a melamine.

The third layer—3 in the drawing is polyester, nylon, polypropylene or metallic (e.g. aluminum) film. By "polyester" is meant polyethylene terephthalate film such as HOSTAPHANE film manufactured by American Hoechst. The thickness of the polyester film can range from about 25 gauge to about 200 gauge, with 48–92 gauge film being particularly suitable. The function of this layer is first, to protect the upper metallic layer from chemical damage (e.g. corrosion) caused by the ingredients of the container, and secondly, to impart strength to the lid structure thereby preventing the lid from being torn when the lid is removed.

The next layer 4 is a polyethylene laminating resin. The density of the polyethylene is from about 3 to about 30 lbs./ream, preferably from 7 to 15 lbs./ream. The polyethylene usable in the layer can be the same as the polyethylene in the co-extruded bottom layer.

The topmost essential layer 5 is a metallic foil, preferably aluminum having a thickness ranging from about 25 gauge to about 100 gauge, most preferably 30 gauge to 50 gauge.

The use of metallic, particularly aluminum, foil provides an excellent barrier against penetration of gases and moisture through the laminated material. In addition, it provides protection from ultraviolet light, and gives the lid an artistically pleasing appearance.

Layer 3 serves primarily to provide strength to the laminated structure. Lids made from this material can be heat sealed to the top of polypropylene high density polyolefin containers and can be subsequently removed in one piece. The added strength provided by the polyester layer permits the entire lid to be removed in one piece, i.e. without tearing.

The polyolefin resin layer 4 acts as a bonding agent for the layer 3 and the metallic foil 5.

Optionally, on the free outer surface of the metallic foil layer, there can be added a primer and ink-printed material, in a manner well known to the art. It is preferable also, regardless of whether or not the material bears printing, to provide an uppermost surface of a lacquer coating. Such coatings for metallic foil surfaces are well known in the art.

This invention will be better understood by reference to the following example which is provided for purposes of illustration and not as a limitation.

EXAMPLE

A lidding material was prepared which had the following structure. The bottom layer consisted of 20 weight % of a lower sub-layer of ethylene methyl acrylate resin co-extruded with 80 weight % of an upper sub-layer of low density polyethylene resin (13 lb/ream). A polyurethane primer (0.7 lb/ream) was then applied to the polyethylene resin sub-layer. The third layer consisted of a 48 gauge film of polyester. Low density polyethylene resin (7 lb/ream) was applied as the fourth layer. An uppermost fifth layer consisted of 30-gauge aluminum foil.

The resulting lidding material adhered tightly to the tops of high density polyethylene and polypropylene cups but yet exhibited sufficient strength to permit ready removal from such cups without tearing of the lidding material.

What is claimed is:

1. A laminated lidding material comprising,
    a co-extruded bottom layer of ethylene methyl acrylate and low density polyethylene resin,
    a primer layer of polyurethene, polyethylene imine or a melamine affixed to said polyethylene resin,
    a film layer of polyester, nylon, polypropylene or metallic foil affixed to said primed polyethylene resin,
    a layer of a low density polyethylene resin affixed to said film layer, and
    as a top layer, a metallic foil affixed to said low density polyethylene layer.

2. A lidding material according to claim 1 in which the metallic foil of the top layer is aluminum foil.

3. A lidding material according to claims 1 or 2 in which the film layer is polyester.

4. A lidding material according to claim 3 in which the primer layer is polyurethane.

5. A lidding material according to claim 4 in which the free upper surface of the aluminum layer is primed and imprinted.

6. A lidding material according to claim 5 in which the primed and printed aluminum foil layer is covered by a lacquer coating.

* * * * *

UNITED STATES PATENT AND TRADEMARK OFFICE
CERTIFICATE OF CORRECTION

PATENT NO. : 4,452,842
DATED : June 5, 1984
INVENTOR(S) : Gary G. Borges & James H. Rebholz It is certified that error appears in the above—identified patent and that said Letters Patent is hereby corrected as shown below:

On the first page, following "Inventors:" and before "Appl. No.:" insert --[73] Assignee: Champion International Corporation, Stamford, Conn. --.

Signed and Sealed this

Eleventh Day of June 1985

[SEAL]

Attest:

DONALD J. QUIGG

Attesting Officer  Acting Commissioner of Patents and Trademarks